United States Patent [19]

Kurihara et al.

[11] Patent Number: 4,991,553
[45] Date of Patent: Feb. 12, 1991

[54] ENGINE CONTROLLER EQUIPPED WITH KNOCKING DETECTOR

[75] Inventors: Nobuo Kurihara, Hitachioota; Masayoshi Kaneyasu; Kouji Kitano, both of Hitachi, all of Japan

[73] Assignee: Hitachi, Ltd., Tokyo, Japan

[21] Appl. No.: 508,657

[22] Filed: Apr. 13, 1990

[30] Foreign Application Priority Data

Apr. 14, 1989 [JP] Japan .................................... 1-92864

[51] Int. Cl.$^5$ .............................................. F02P 5/15
[52] U.S. Cl. ...................................... 123/425; 73/35; 364/431.08
[58] Field of Search ..................... 123/425, 435; 73/35; 364/431.08

[56] References Cited

U.S. PATENT DOCUMENTS

| | | | |
|---|---|---|---|
| 4,316,440 | 2/1982 | Yamaguchi et al. | 123/425 X |
| 4,337,641 | 7/1982 | Sugihara et al. | 73/35 |
| 4,341,189 | 7/1982 | Yamaguchi et al. | 123/425 |
| 4,345,558 | 8/1982 | Yamaguchi et al. | 123/425 |
| 4,356,551 | 10/1982 | Iwase et al. | 123/425 X |
| 4,465,047 | 8/1984 | Yamaguchi et al. | 123/425 |

FOREIGN PATENT DOCUMENTS 42821 3/1982 Japan .
45520 3/1983 Japan .

Primary Examiner—Tony M. Argenbright
Attorney, Agent, or Firm—Antonelli, Terry, Stout & Kraus

[57] ABSTRACT

An engine controller equipped with a device for judging occurrence of knocking of the engine, having a sensor for sampling a vibration based on an internal pressure vibration arisen in a cylinder of the engine and a knocking detecting means for judging the occurrence of the knocking by obtaining at least two frequencies contained in an output from the sensor, obtaining a knocking judgement index from two vibration power factors corresponding to the two frequencies and comparing the knocking judgement index with a threshold value. As being judged from the knocking judgement index, the occurrence of the knocking is accurately detected when the background vibration is great at the time of the high load high speed operation.

14 Claims, 10 Drawing Sheets

FIG. 5

| N \ $T_i$ | 0.5 | 1 | 1.5 | 1.75 | 2 | 2.5 | 3 | 3.5 | 4 | 4.5 | 5 | 5.5 | 6 | 6.5 | 7.25 | 8 (msec) |
|---|---|---|---|---|---|---|---|---|---|---|---|---|---|---|---|---|
| 906 | | | | | | | | | | | | | | | | |
| 1200 | 10 | 10 | 12 | 12 | 12 | 9 | 6 | 6 | 4 | 4 | 4 | 4 | 4 | 4 | 4 | 4 |
| 1500 | 14 | 16 | 19 | 24 | 22 | 19 | 13 | 8 | 5 | 5 | 5 | 5 | 5 | 5 | 5 | 5 |
| 2000 | 16 | 21 | 27 | 29 | 30 | 24 | 18 | 13 | 10 | 8 | 6 | 6 | 6 | 6 | 6 | 6 |
| 2500 | 18 | 23 | 28 | 31 | 34 | 26 | 24 | 20 | 16 | 14 | 12 | 12 | 12 | 11 | 11 | 11 |
| 3000 | 21 | 26 | 31 | 33 | 36 | 30 | 28 | 24 | 20 | 16 | 16 | 16 | 16 | 16 | 16 | 14 |
| 3500 | 24 | 28 | 35 | 36 | 36 | 33 | 30 | 27 | 24 | 20 | 20 | 20 | 20 | 18 | 16 | 14 |
| 4000 | 27 | 32 | 37 | 38 | 38 | 36 | 32 | 30 | 27 | 24 | 24 | 24 | 24 | 22 | 20 | 20 |
| 4500 | 31 | 35 | 40 | 43 | 40 | 38 | 34 | 30 | 30 | 26 | 26 | 26 | 26 | 24 | 22 | 21 |
| 5000 | 33 | 37 | 41 | 45 | 42 | 40 | 36 | 32 | 30 | 28 | 28 | 28 | 28 | 26 | 24 | 22 |
| 5500 | 35 | 39 | 41 | 45 | 42 | 40 | 36 | 32 | 32 | 30 | 30 | 30 | 30 | 28 | 26 | 24 |
| 6000 | 37 | 41 | 42 | 45 | 43 | 40 | 38 | 34 | 32 | 30 | 30 | 30 | 30 | 28 | 26 | 24 |
| 6500 | 40 | 41 | 42 | 45 | 43 | 42 | 38 | 36 | 34 | 32 | 32 | 32 | 32 | 30 | 28 | 26 |
| 7000 | 41 | 42 | 43 | 46 | 45 | 42 | 40 | 36 | 34 | 32 | 32 | 32 | 32 | 30 | 28 | 26 |
| 7500 | 42 | 43 | 44 | 47 | 45 | 44 | 40 | 38 | 36 | 34 | 34 | 34 | 34 | 32 | 30 | 28 |
| 8000 | 42 | 43 | 44 | 47 | 45 | 44 | 42 | 40 | 38 | 34 | 34 | 34 | 34 | 32 | 30 | 30 |
| | 42 | 43 | 44 | 47 | 45 | 44 | 42 | 40 | 38 | 36 | 36 | 36 | 36 | 32 | 30 | 30 |

(R.P.M.)

4,991,553

ENGINE CONTROLLER EQUIPPED WITH KNOCKING DETECTOR

BACKGROUND OF THE INVENTION

This invention relates to an engine controller equipped with knocking detection means and more particularly to an engine controller which is controlled by judging occurrence of knocking using a knocking judgement index based on a vibration power spectra of resonance frequencies.

When knocking occurs in a engine, a vibration having specific resonance frequency components occurs. Detection of occurrence of knocking is attained by separating vibration resulting from the occurrence of knocking from background vibration, in the vibration which constitutes the overall engine vibration detected by a vibration sensor.

As described in Japanese Patent Laid-open No. 58-45520 (1983) a conventional knocking detector preliminarily selects and separates a single resonance frequency component within the range of 5 to 10 KHz from the engine vibration by use of a bandpass filter and judges the occurrence of knocking by judging whether or not this resonance frequency component is greater than a predetermined level.

Since the prior art technique described above judges the existence of occurrence of knocking by use of only the single frequency component contained in the output of the vibration sensor, the deviation of background vibration becomes greater than the vibration due to the occurrence of knocking at the time of a high load, high speed operation where the background vibration becomes great. Accordingly, the vibration due to the occurrence of knocking and the background vibration cannot be effectively separated from the output of the vibration sensor, and so the detection of the occurrence of knocking cannot be made.

SUMMARY OF THE INVENTION

A first object of the invention is to provide a knocking detector which is capable of judging the occurrence of knocking even at the time of a high load, high speed operation.

It is a second object of the present invention to provide a knocking which is capable of judging the occurrence of weak knocking over a full range of operating conditions of the engine.

It is a third object of the present invention to provide a knocking detector which is capable of judging the occurrence of knocking even at the time of a high load, high speed operation.

It is a fourth object of the present invention to provide an engine controller which is capable of improving the engine output and fuel efficiency at the time of a high load, high speed operation.

It is a fifth object of the present invention to provide an engine controller which is capable of fully utilizing information contained in a vibration sensor and is capable of controlling ignition timing so as to attain an optimum engine output and optimum fuel efficiency.

In order to accomplish the first object described above, the present invention comprises a vibration sensor for detecting engine vibration or a cylinder internal pressure vibration, and a judgement unit for determining a tone color index in. accordance with knocking from at least two frequency components contained in the output of the vibration sensor, and for judging the existence of knocking from the tone color index.

In order to accomplish the second object described above, the present invention comprises a vibration sensor for detecting engine vibration or a cylinder internal pressure vibration, a crank angle sensor for detecting a crank angle of the engine, a sampling circuit for sampling digital values of the outputs of the vibration sensor ranging from a first crank angle to a second crank angle at predetermined time intervals, a memory for storing the digital values, an analysis device for analyzing frequency components contained in the output of the vibration sensor on the basis of the content of the memory, and a judgement unit for judging the existence of occurrence of knocking in accordance with the frequency component.

In order to accomplish the third object described above, the present invention utilizes a vibration sensor whose detection sensitivity is substantially constant at 5 KHz to 20 KHz, and judgement unit means for judging the existence of occurrence of knocking on the basis of an output of the vibration sensor.

In order to accomplish the fourth object described above, the present invention utilizes a vibration sensor for detecting engine vibration or a cylinder internal pressure vibration, an A/D convertor for converting the output of the vibration sensor to digital signals, a judgement unit for receiving the digital signals and separating and discriminating between other vibrations and a vibration based on knocking and judging the existence of occurrence of knocking, and an ignition timing control for controlling an ignition timing on the basis of the output of the judgement unit.

In order to accomplish the fifth object described above, the present invention utilizes a vibration sensor for detecting engine vibration or a cylinder internal pressure vibration, a first memory for storing a program, a first microcomputer for receiving the output of the vibration sensor, judging the existence of occurrence of knocking in accordance with the program of the first memory and storing in a second memory the result of such judgement, an engine condition sensor for detecting an engine condition, a third memory for storing a program, and a second microcomputer for calculating the ignition timing in accordance with the program of the third memory on the basis of the output of the engine condition sensor and of the memory content of the second memory.

BRIEF DESCRIPTION OF THE DRAWING

FIG. 5 is ignition timing map in accordance with present invention.

DETAILED DESCRIPTION OF THE PREFERRED EMBODIMENTS

Figure 1:
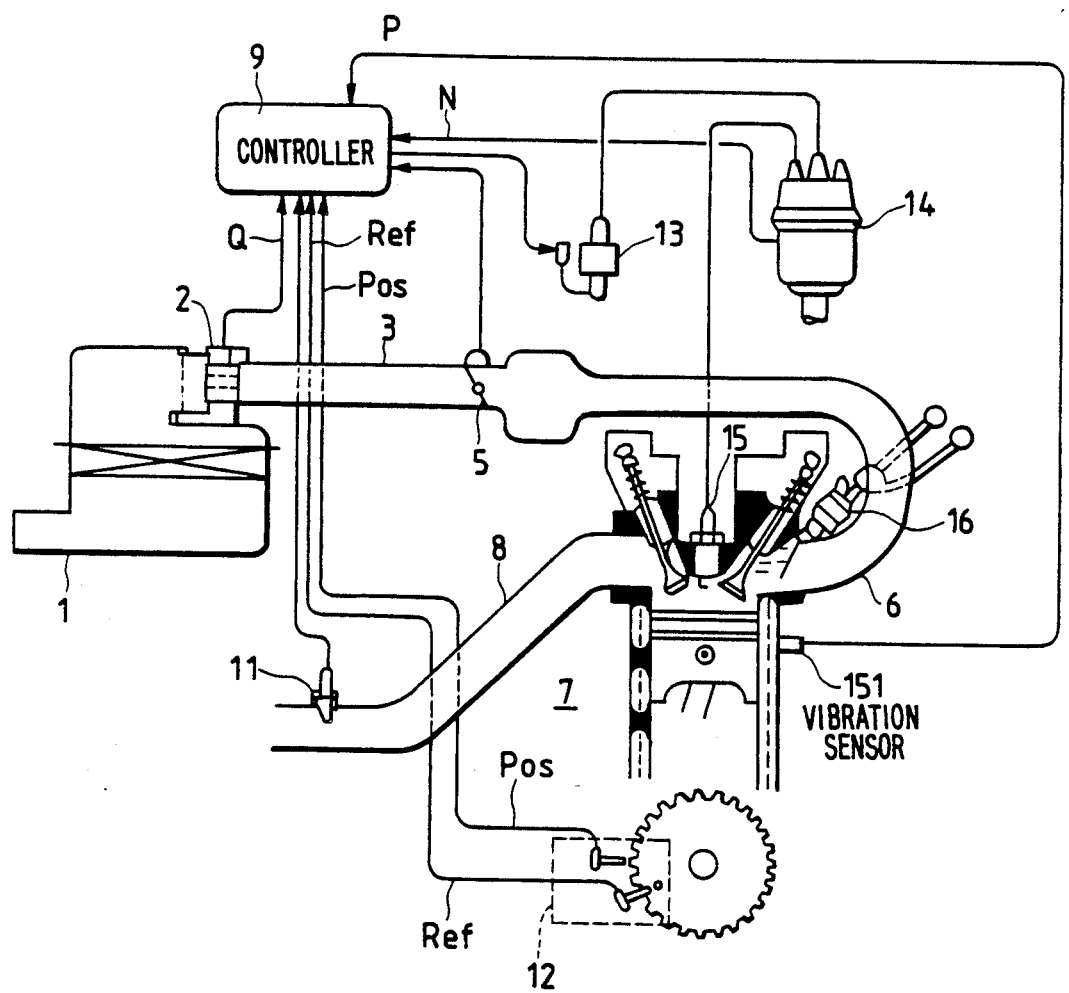
FIG. 1 is a diagrammatic view of engine controller forming an embodiment of the present invention.

The first feature of the present invention determines a knocking judgement index from at least two resonance frequency components contained in the output of the vibration sensor and judges the occurrence of knocking from the knocking judgement index. Since the occurrence of knocking can be judged from a combination of at least two resonance frequency components contained in the output of the vibration sensor in this manner, vibration due to the occurrence of knocking and background vibration can be separated and discriminated from each other even during high load, high speed operation where the background vibration is great. Thus, in this way, whether or not knocking occurs can be judged accurately.

The feature of the present invention samples the digital value of the output of the vibration sensor ranging from a first crank angle to a second crank angle at predetermined time intervals, stores the result in a memory, analyzes the frequency components on the basis of the memory content and judges the occurrence of knocking by the frequency components. Accordingly, an arbitrary frequency component contained in the output of the vibration sensor can be obtained and the occurrence of knocking can be judged by use of the frequency component in which vibration occurs most remarkably in accordance with the operating state of the engine. Therefore, the occurrence of weak knocking can be judged throughout all the operating conditions of the engine.

The third feature of the present invention detects substantially uniformly the engine vibration within the range of from 5 KHz to 20 KHz, and judges the occurrence of knocking on the basis of this detection. Since the occurrence of knocking can be judged in a frequency range where background vibration is small, such as at the time of high load, high speed operation, whether or not knocking occurs can be judged even at the time of the high load, high speed operation.

The fourth feature of the present invention converts the output of the vibration sensor to a digital signal, separates and discriminates, using this digital signal, between other background vibrations and vibration based on knocking by digital processing so as to judge the existence of occurrence of knocking and controls the ignition timing by this judgement. Since separation and discrimination by digital processing can thus be made, the occurrence of knocking can be judged reliably even at the time of high load, high speed operation. Moreover, since the control of advance or retard angle of the ignition timing can thus be made, the engine output as well as fuel efficiency can be improved.

In the fifth feature of the present invention, a first microcomputer judges the occurrence of knocking on the basis of the digital value of the output of the vibration sensor in accordance with a program stored in a first memory, and a second microcomputer calculates the ignition timing on the basis of the occurrence of knocking in accordance with the program in the third memory. Therefore, the first microcomputer performs complicated processing in accordance with the program, on a real time basis, and so the information contained in the vibration sensor can be utilized effectively. In this manner, the ignition timing control can be effective as to optimize the engine output and fuel efficiency.

The principle used for judgement of occurrence of knocking in accordance with the present invention will be explained. The engine vibration contains a large number of vibration components. They are, for example, the vibration components due to friction of the piston, rotation of the crank shaft, operation of the valves, and so forth. Furthermore, these vibration components change in accordance with the type or condition of the engine.

When knocking occurs in an engine, a vibration inherent to knocking occurs. The judgement of the occurrence of knocking is made by separating the vibration inherent to the knocking from the overall vibrations of the engine detected by the vibration sensor.

Figure 8A:
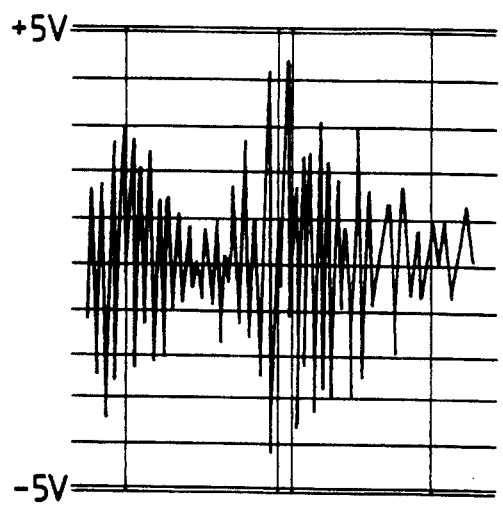
FIGS. 8A and 8C show the output signals of the vibration sensor 151 in FIG. 1.
Figure 8B:
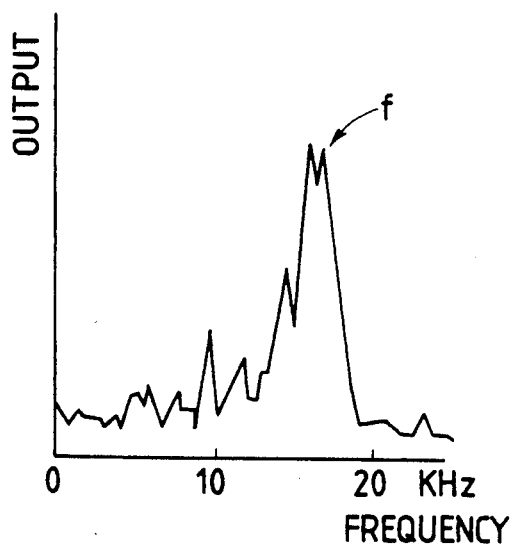
FIGS. 8B and 8D shows results of frequency analysis of the output signals from the vibration sensor 151.
Figure 8C:
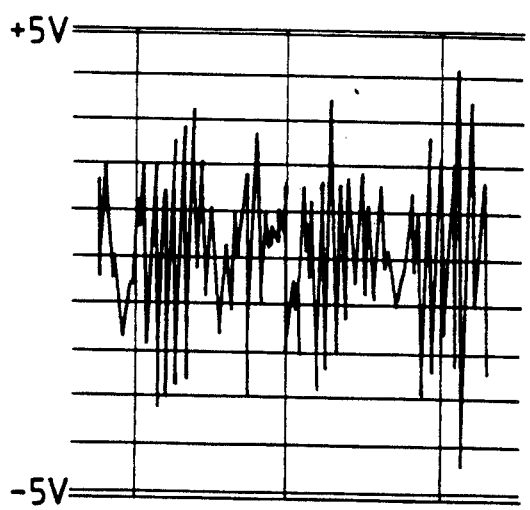
Figure 8D:
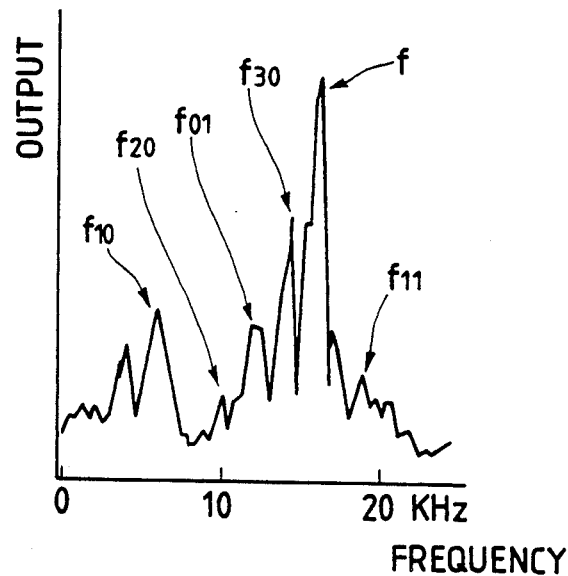

FIGS. 8A and 8B show the output of a vibration sensor when knocking does not occur and the results of analysis of frequency components of the vibration sensor, respectively. FIGS. 8C and 8D show the output of the vibration sensor when knocking occurs and the results of analysis of the frequency components of the output of the vibration sensor, respectively.

As shown in following Table 1, assuming that the divisions of a cylinder are n in the radial direction and m in the circumferential direction and that the resonance vibration mode for a given time is $\eta_{nm}$, then a resonance frequency $f_{nm}$ exists in accordance with various valves.

As shown in FIGS. 8B and 8D, when knocking occurs, each resonance frequency component becomes greater than when knocking does not occur.

TABLE 1

| resonance vibration mode $P_{nm}$ | resonance vibration frequency |
|---|---|
| $p_{10} = 1.841$ | $f_{10} = 6.3$ KHz |
| $p_{20} = 3.054$ | $f_{20} = 10.4$ KHz |
| $p_{01} = 3.832$ | $f_{01} = 13.0$ KHz |
| $p_{30} = 4.201$ | $f_{30} = 14.3$ KHz |
| $p_{11} = 5.332$ | $f_{11} = 18.1$ KHz |

Next, the judgement of occurrence of knocking using the knocking judgement index will be explained with reference to FIGS. 9A and 9B. Incidentally, frequency components with resonance frequencies $f_{10}$ (6.3 KHz) and $f_{01}$ (13.0 KHz) will be used for the explanation of the principle of operation, but at least two, arbitrary, resonance frequency components may be used.

The vibration sensor detects a combined vibration consisting of the vibration due to the occurrence of knocking and the background vibration. Accordingly, when knocking does not occur, the knocking judgement index I obtained from the vibration sensor outputs becomes $I_b$, which is obtained from only the background vibration; and, when the knocking occurs, the knocking judgement index I becomes a combined index including $I_k$ obtained from the vibration due to the occurrence of knocking and the index $I_b$ obtained from the background vibration.

The knocking judgement index I stated above is:

$$I = \omega_{10}P(f_{10}) + \omega_{20}P(f_{20}) + \omega_{01}(f_{01}) + \omega_{30}P(f_{30}) + \omega_{11}(f_{11}) \ldots \quad (1)$$

In formula (1), $\omega_{10}$, $\omega_{20}$, $\omega_{01}$, $\omega_{30}$ and $_{11}$ designate functions depending on the number of revolutions of the engine and P designates a vibration power spectrum corresponding to each resonance frequency component $f_{10}$, $f_{20}$, $f_{01}$, $f_{30}$ or $f_{11}$.

Figure 9A:
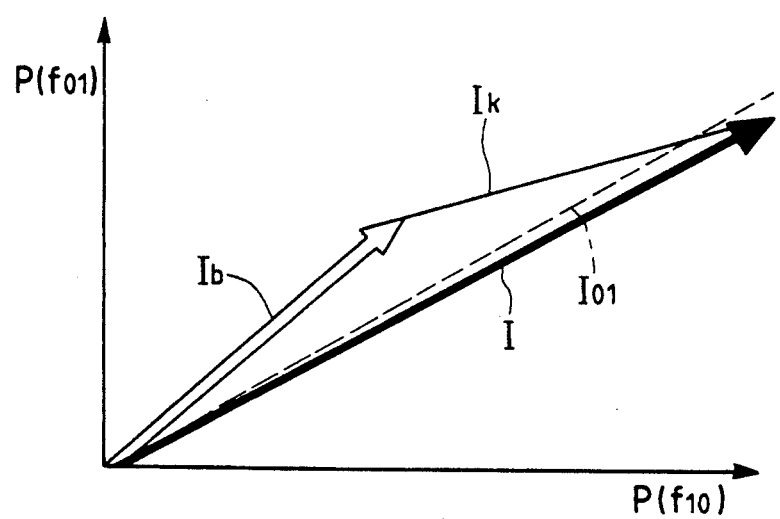
FIGS. 9A and 9B shows relations between knocking judgement indexes and threshold values in accordance with the present invention.
Figure 9B:
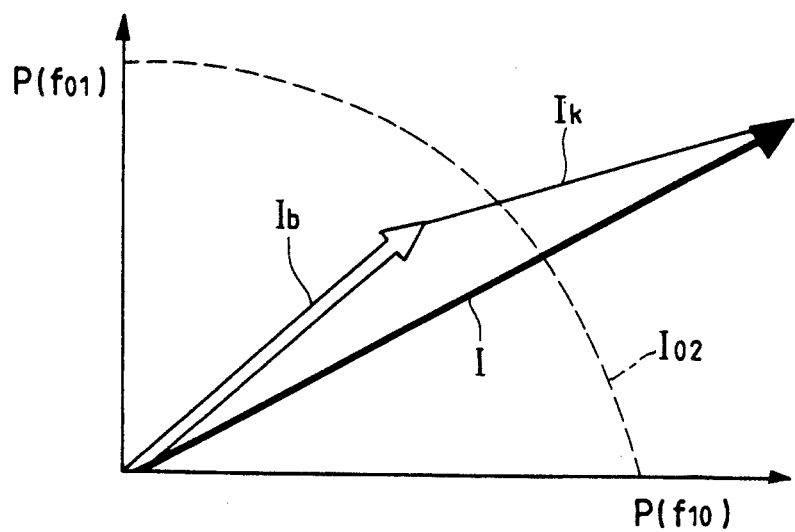

As shown in FIGS. 9A and 9B, the knocking judgement index $I_b$ represented by the resonance frequency component of the background vibration and the index $I_k$ represented by the resonance frequency component of the vibration due to the occurrence of knocking have mutually different directions. This is because the characteristics of the frequency component of each vibration are different and their tone color indices are different, as apparent from a human acoustic sense test. When knocking occurs, a special tone color, for example a cyclic sound such as "kari kari", is heard.

When the vibration due to the occurrence of knocking is added to the background vibration, the knocking judgement index I, due to the $f_{01}$, $f_{10}$ components contained in the vibration from the vibration sensor, falls below a threshold $I_{01}$ in FIG. 9A, and in the case shown in FIG. 9B, the index I extends outside of a threshold $I_{02}$ so as to indicate the occurrence of knocking.

Incidentally, use of a combination of a plurality of resonance frequency components contained in the output of the vibration sensor will be defined as the knocking judgement index stated above.

In using the knocking judgement index, the structure of the frequency component being specific to the occurrence of knocking can be taken into consideration in connection with the background vibration so that the occurrence of knocking can be judged even when the background vibration becomes great.

The construction of an embodiment of the present invention will be explained using FIG. 1. Air comes in via an air cleaner 1 and is sucked into a cylinder of the engine 7 through a duct 3, a throttle body 5 having a throttle valve and an intake pipe 6. A hotwire air flow meter 2 disposed in the duct 3 detects the suction air quantity Q and this detection signal is inputted to a control unit 9.

On the other hand, fuel is injected from a fuel tank, not shown, through an injector 16, is mixed with the intake air inside the suction path and is supplied into the cylinder of the, engine 7. The air-fuel mixture is compressed in the cylinder of the engine 7, ignited by a spark plug 15 and discharged from an exhaust pipe 8 after explosion. An exhaust sensor 11 is disposed in the exhaust pipe 8 and its detection signal is inputted to the control unit 9.

The high voltage that is generated by the spark coil 13 is distributed to each cylinder by a distributor 14 and is supplied to the spark plug 15. A crank angle sensor 12 detects the rotating condition of the engine, and outputs a signal $R_{ef}$ which shows an absolute angle position in each revolution of the engine and signal $P_{os}$ which shows a shifted angle position which is shifted a predetermined angle from the angle $R_{ef}$.

The detection signal is inputted to the control unit 9. A vibration sensor 151 for detecting vibration is fitted to the engine 7 and its detection signal P is inputted to the control unit 9.

The control unit 9 calculates the fuel supply quantity, the ignition timing etc., on the basis of the signal from each sensor and outputs a control signal to each actuator, such as the spark coil 13.

Figure 2:
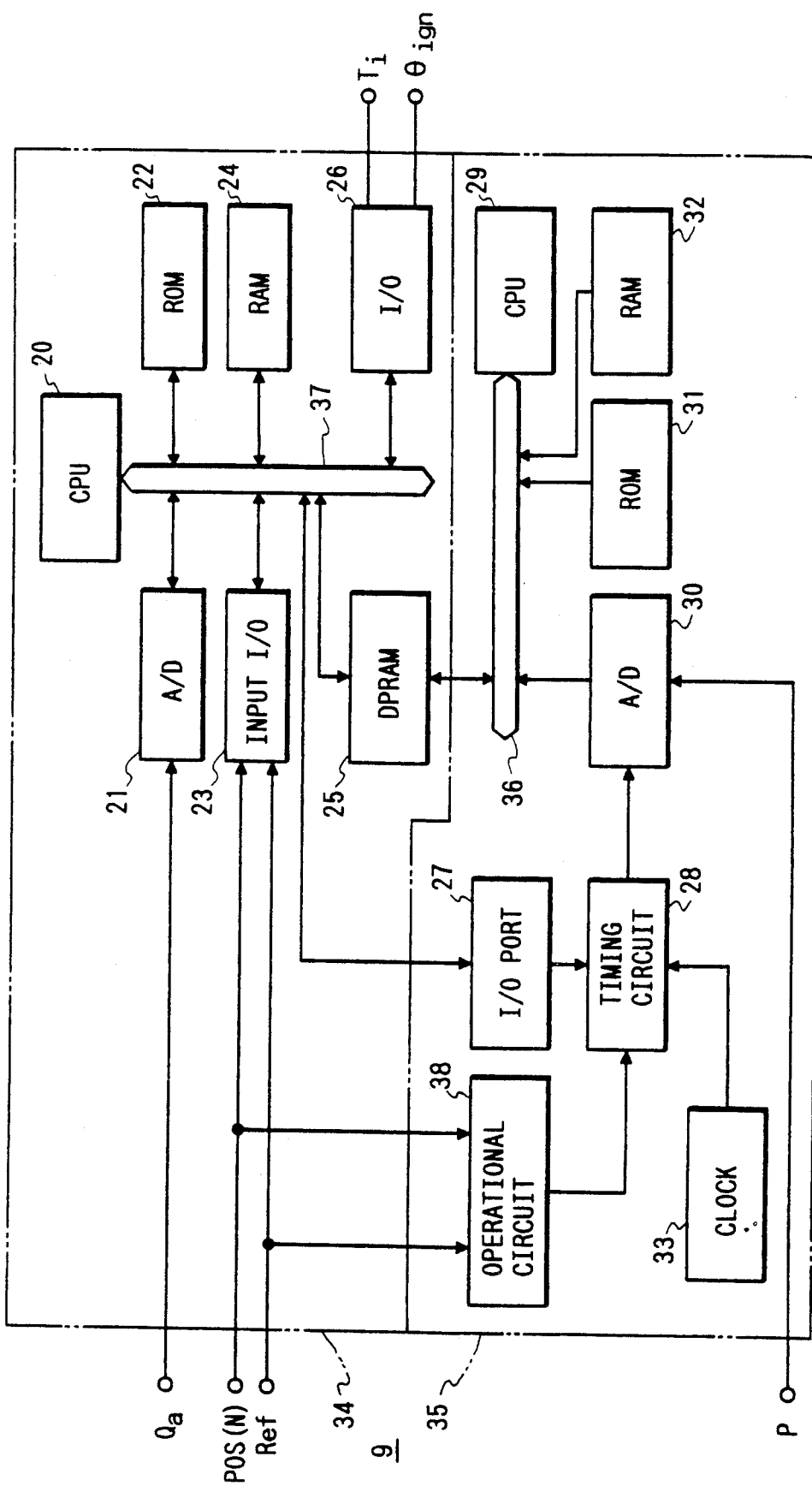
FIG. 2 is a block diagram of a control unit 9 in FIG. 1.

FIG. 2 shows details of the control unit 9. The control unit 9 is divided into a control block 34 consisting of CPU 20, A/D converter 21, ROM 22, input I/O 23, RAM 24, dual port RAM (DPRAM) 25; bus 37 and output I/O 26, and a knocking detection block 35 consisting of CPU 29, port 27, timing circuit 28, A/D convertor 30, ROM 31, RAM 32, bus 36 and clock 33. Data exchange between CPUs 20 and 29 is made through the DPRAM 25.

The suction air quantity Qa detected by the hot-wire flow meter 2 is converted to a digital value by the A/D converter 21 and is inputted to CPU 20. The signal Ref and the signal $P_{os}$ detected by the crank angle sensor 12 are inputted to CPU 20 through I/O 23. CPU 20 performs processing in accordance with the program stored in ROM 22 and the result of the processing is transmitted as the fuel injection time $T_i$, which represents on injection quantity, and the ignition timing signal $\theta_{ign}$ from the output I/O 26 to each actuator. The data necessary for the processing is held by RAM 24.

On the other hand, when a top dead center signal TDC is generated, a timing circuit 28 divides the frequency of the period signal which is generated by a clock 33, in accordance with the content inputted by CPU 20 to the port 27, and generates a sampling signal. When this sampling signal is generated, the A/D converter 30 converts the output signal P of the vibration sensor 15 to a digital value.

Figure 3A:
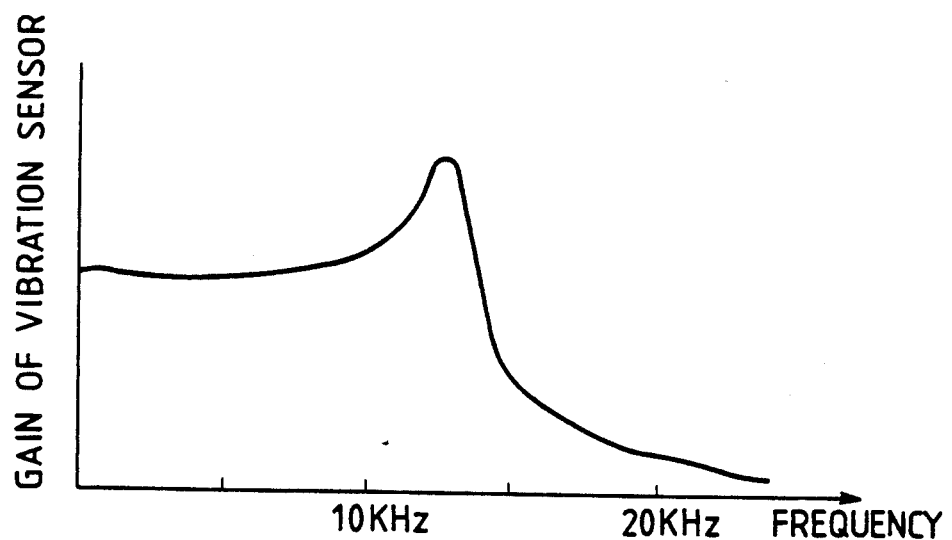
FIGS. 3A and 3B are a characteristic views showing the output of a conventional vibration sensor. 15 FIG. 4A a flow-chart which shows the calculation of an ignition timing in accordance with the present invention.
Figure 3B:
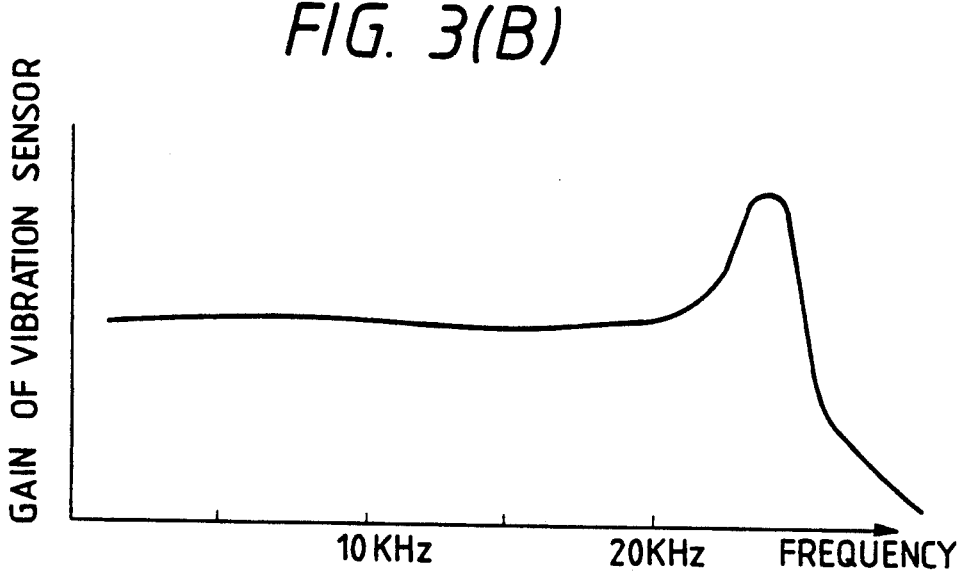

A conventional vibration sensor resonates near 13 KHz, as shown in FIG. 3A, but this invention uses a vibration sensor which resonates at 17 KHz or higher as shown in FIG. 3B in order to obtain resonance frequency components in a range at least from 17 to 20 KHz.

CPU 27 lets RAM 32 store the digital value sampled in accordance with the program stored in ROM 31, analyzes the frequency on the basis of the stored data and judges the occurrence of knocking. The result of this judgement is transmitted to CPU 20 through DPRAM 25.

The calculation operation of the ignition timing executed in each ignition cycle by CPU 20 will be explained with reference to the flowchart shown in FIG. 4A. The operation of this flowchart is initiated at a predetermined time interval, e.g. every 20 msec. First of all, the number of revolutions N of the engine and the suction air quantity Q are read from predetermined registers inside RAM 24 at step 201. At the next step 202, the suction air quantity per unit number of revolutions, that is, Q/N, is calculated. Further, a fuel injection time $T_i$ is determined from Q/N and a basic ignition timing $\theta_{base}$ is determined from a basic ignition timing map stored in ROM 22 for fuel supply, such as shown in FIG. 5. At step 203, whether or not knocking occurs is judged in accordance with the content of a later appearing knock flag in FIG. 7. If knocking occurs at this time, subtraction is made between a value of ignition timing $\theta_{adv}$ and a predetermined retard angle quantity $\theta_{ret}$ at step 213. Incidentally, this subtraction retards the ignition timing. A counter A is initialized at step 214 and then flow proceeds to step 208 the counter A is in RAM 24 and is set a recovering pace by comparing the ignition timing retarded when the knocking occurs with a predetermined number of times, for example 50 in FIG. 4A step 205.

Figure 4A:
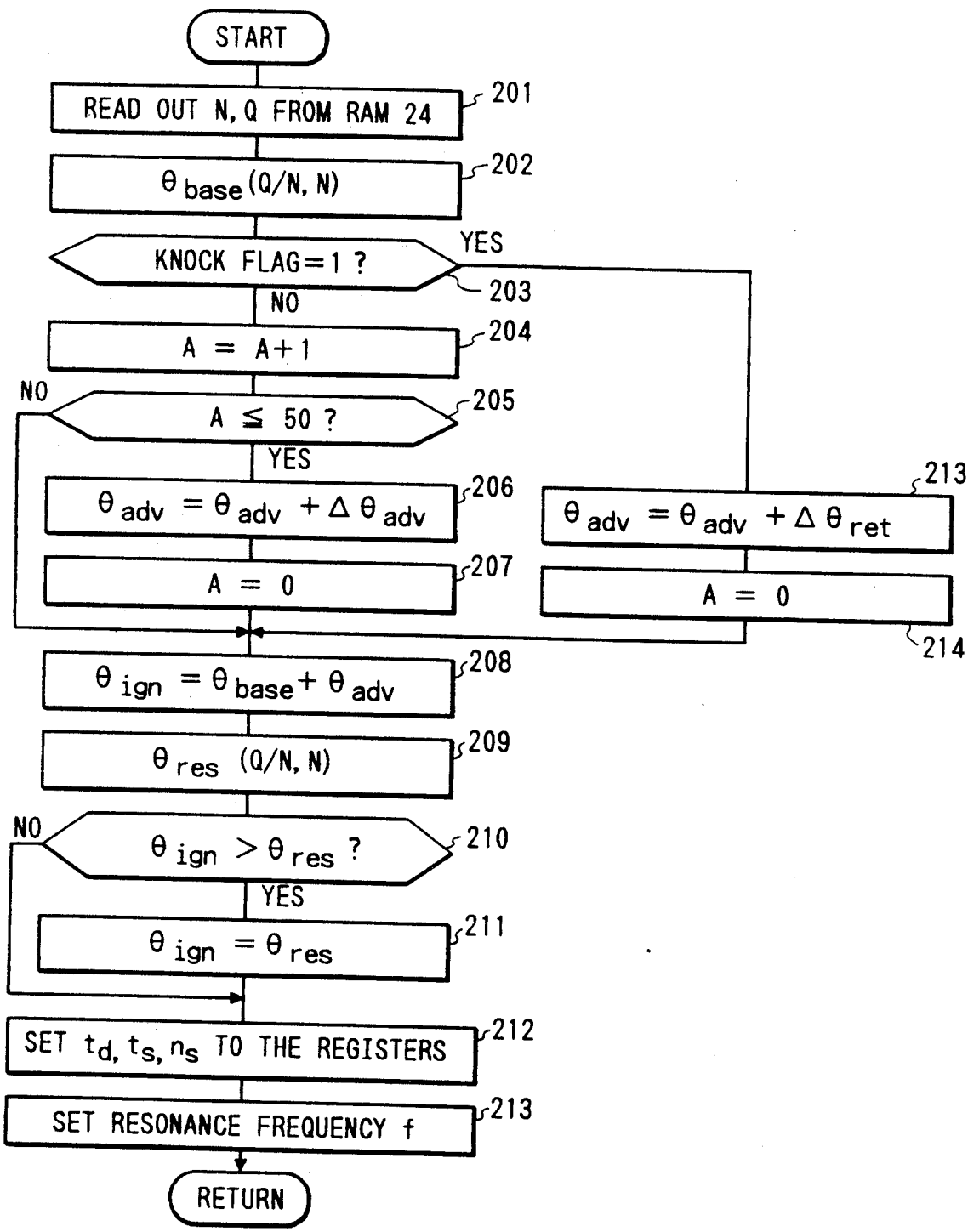
FIG. 4B is flow-chart which shows the calculation of an advance angle quantity according to the revolution number of the engine in FIG. 4A.
FIG. 4C is a flow-chart which shows calculation of retard angle quantity in FIG. 4A.
FIG. 4D is a flow-chart which shows abnormality judgement of the vibration sensor 151.
Figure 4B:
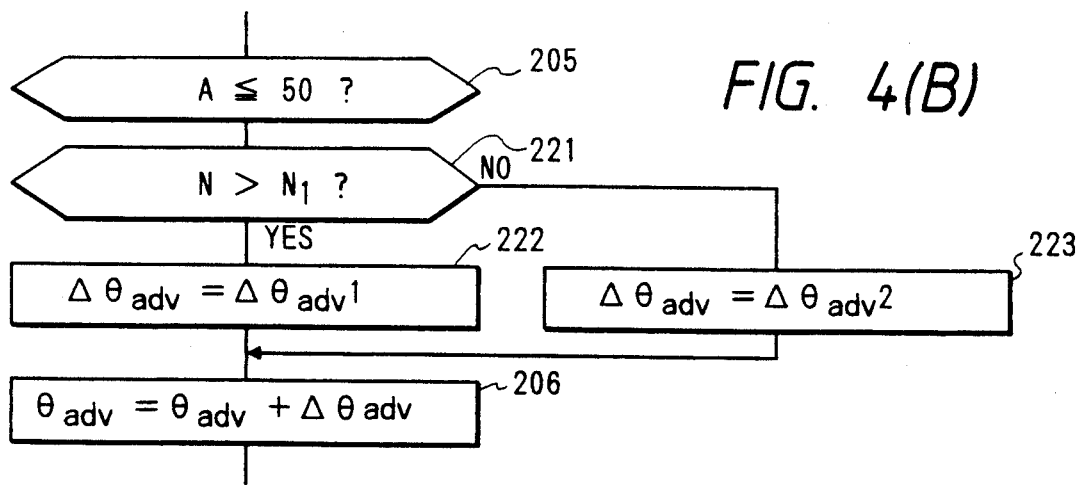
Figure 4C:
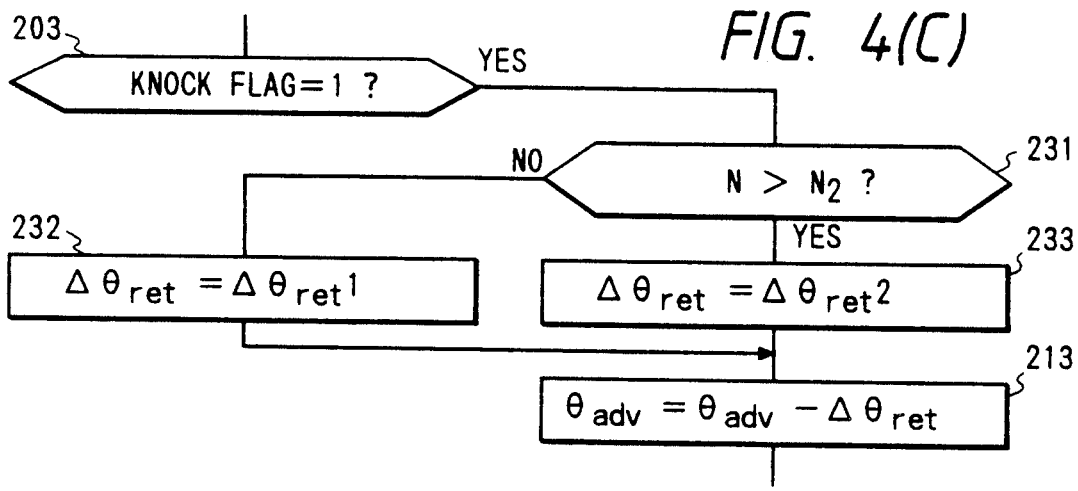

By the way, in step 213 in order to prevent an occurrence of a violent knocking at high speed of the engine, the retard angle quantity is varied according to the revolution speed of the engine, as shown in a flowchart of FIG. 4C. In other words, if knocking does not occur at step 203, whether or not the number of revolutions N of the engine is greater than a predetermined number of revolutions $N_2$ is judged at step 231. If N is smaller than $N_2$, the retard angle quantity $\Delta\theta_{ret1}$ is set to be the retard angle quantity $\Delta\theta_{ret}$: If N is greater than the predetermined number of revolutions $N_2$, $\Delta\theta_{ret2}$ which is greater than $\Delta\theta_{ret1}$ is set to be $\Delta\theta_{ret}$ at step 233 so as to set a proper retard angle quantity.

Now, in FIG. 4A, if knocking occurs at step 203, the count data in counter A is incremented by one at step 204. This count data in counter A is set in order to judge whether or not the ignition timing $\theta_{adv}$ retarded by the occurrence of the knocking reaches a time when the advance angle quantity $\Delta\theta_{adv}$ is recovered. Next, whether or not the count data in counter A is equal to a predetermined value 50 is judged at step 205. Since this flowchart in FIG. 4A is actuated every 20 msec, one second has passed after the initialization of the count data A when the count data A becomes equal to 50, and so recovery occurs every second. If the counter data A is not equal to 50 at step 205, the flowchart proceeds to step 206. The predetermined advance angle quantity $\Delta\theta_{adv}$ is added to the retard angle value $\theta_{adv}$ at this step 206, and this addition recovers the ignition timing.

Furthermore, as shown in the flowchart of FIG. 4B, the advance angle quantity $\Delta\theta_{adv}$ may be made variable on the basis of the number of revolutions in order to suppress the occurrence of the violent knocking caused of a radical changing of the advance angle. In other words, if A=50 at step 205, whether or not the number of revolutions N of the engine is greater than the predetermined number of revolutions $N_1$ is judged at step 221. If N is greater than $N_1$, $\Delta\theta_{adv1}$ is used as $\Delta\theta_{adv}$ at step 222. If N is smaller than $N_1$, the advance angle quantity $\Delta\theta_{adv2}$ which is smaller than $\Delta\theta_{adv1}$ is used as the advance angle quantity $\Delta\theta_{adv}$ at step 223 so as to change the advance angle gradually.

The ignition timing $\theta_{ign}$ is then calculated on the basis of the basic ignition timing $\theta_{base}$ and the advance angle value $\theta_{adv}$ described above at step 208. The maximum advance angle value $\theta_{res}$ is determined in accordance with the suction air quantity Q per number of revolutions N of the engine, i.e. Q/N, and per unit number of revolutions at step 209. This maximum advance angle value $\theta_{res}$ is read out from the maximum advance angle value map stored in ROM 31. Then, whether or not the ignition timing $\theta_{ign}$ exceeds the maximum advance angle value $\theta_{res}$ is judged at step 210. If it does not, the flowchart proceeds to step 211. If it does, the maximum advance angle value $\theta_{res}$ is used as the ignition timing $\theta_{ign}$ because the advance angle is too great, at step 211.

Figure 4D:
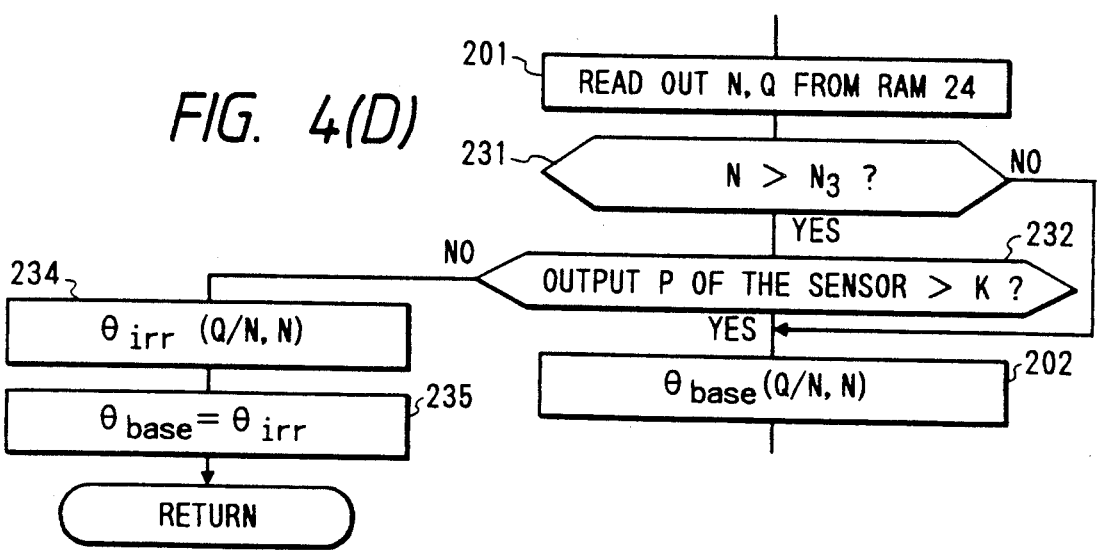

Here, FIG. 4D shows that before executing step 202, abnormality judgement of the vibration sensor is performed on the basis of the output of the vibration sensor after the number of revolutions N and the suction air quantity Q are inputted so as to improve the reliability of the vibration sensor.

After the number of revolutions N and the suction air quantity Q are inputted at step 20, whether or not the number of revolutions N of the engine is greater than a predetermined number of revolutions $N_3$ is judged at step 231. If N is smaller than $N_3$, the flow proceeds to step 202 because the output of the vibration sensor is not so great that abnormality detection can be determined.

If the number of revolutions of the engine is found the greater than the predetermined number of revolutions $N_3$ at step 231, whether or not the vibration sensor output is greater than a predetermined level K is judged at step 232. If it is, the vibration sensor is judged as being normal and the flow proceeds to step 202. If the output of the vibration sensor is smaller than a predetermined level, the vibration sensor is judged as being abnormal, and the ignition timing for the case of abnormality of the vibration sensor is determined at step 234. At this step 234, the ignition timing $\theta_{irr}$ for abnormality in accordance with the suction air quantity per number of revolutions N and per unit revolution is searched from the map stored in ROM 22. Incidentally, the ignition timing $\theta_{irr}$ for abnormality thus searched is a value which is sufficiently retarded from the value stored in the map of the basic ignition timing, and is a value which does not generate knocking. At step 235, $\theta_{irr}$ is used as the basic ignition timing $\theta_{base}$ and the flow is completed without calculating the ignition timing otherwise required by the detection of knocking.

After setting the ignition timing $\theta_{ign}$, as stated above, at step 212 in FIG. 4A, a delay time $t_d$, the number of sampling points $n_s$ and a frequency division ratio $t_s$ are outputted to the port 27 in accordance with the engine condition. The main comparison resonance frequency f is set into DPRAM 25 in accordance with the engine condition at step 213 and the operation indicated by the flowchart in FIG. 4A is then completed.

Incidentally, the sampling period of the digital values of the output of the vibration sensor is determined by the frequency division ratio $t_s$ and the number of sampling points is determined by the number of sampling points $n_s$.

Table 2 illustrates those frequency components which are set in DPRAM 25 and are selected when the number of sampling points is 16 and the sampling period is 25 $\mu$sec, 26.4 $\mu$sec and 25.9 $\mu$sec, respectively.

Table 2 is referred to in order to get a frequency corresponding to the main resonance frequency in Table 1. When the frequency $f_{11}(=18.1$ KHz) in Table 1 is selected, the frequency 18.098 in sampling time 25.9 $\mu$sec and wave number 15 of Table 2 is selected as it is the most approximate value. Therefore, when the output of the vibration sensor is detected in the wave number 15 and the sampling timing 18.098 KHz, an accurate frequency analysis in main resonance frequency is performed so as to judge the occurrence of knocking correctly.

TABLE 2

| sampling timing wave number | 25 μsec | 26.4 μsec | 25.9 μsec |
|---|---|---|---|
| 1 | 1.25 [KHz] | 1.184 [KHz] | 1.207 [KHz] |
| 2 | 2.50 | 2.367 | 2.413 |
| 3 | 3.75 | 3.551 | 3.620 |
| 4 | 5.00 | 4.735 | 4.826 |
| 5 | 6.25 | 5.919 | 6.033 |
| 6 | 7.50 | 7.102 | 7.239 |
| 7 | 8.75 | 8.286 | 8.446 |
| 8 | 10.00 | 9.470 | 9.653 |
| 9 | 11.25 | 10.653 | 10.859 |
| 10 | 12.50 | 11.837 | 12.066 |
| 11 | 13.75 | *13.021 | 13.272 |
| 12 | 15.00 | *14.205 | 14.479 |
| 13 | 10.25 | 15.388 | 15.685 |
| 14 | 17.50 | 16.572 | 16.892 |
| 15 | 18.75 | 17.756 | *18.098 |
| 16 | 20.00 | 18.939 | 19.305 |

As described above, resolution of the frequency analysis is determined by the sampling period and the number of sampling points. The values $t_d$ and $n_s$ that are set at step 212 are determined and set so that the resonance frequency components necessary for the judgement of the existence of occurrence of knocking in accordance with the operating condition of the engine can be obtained.

Figure 6A:
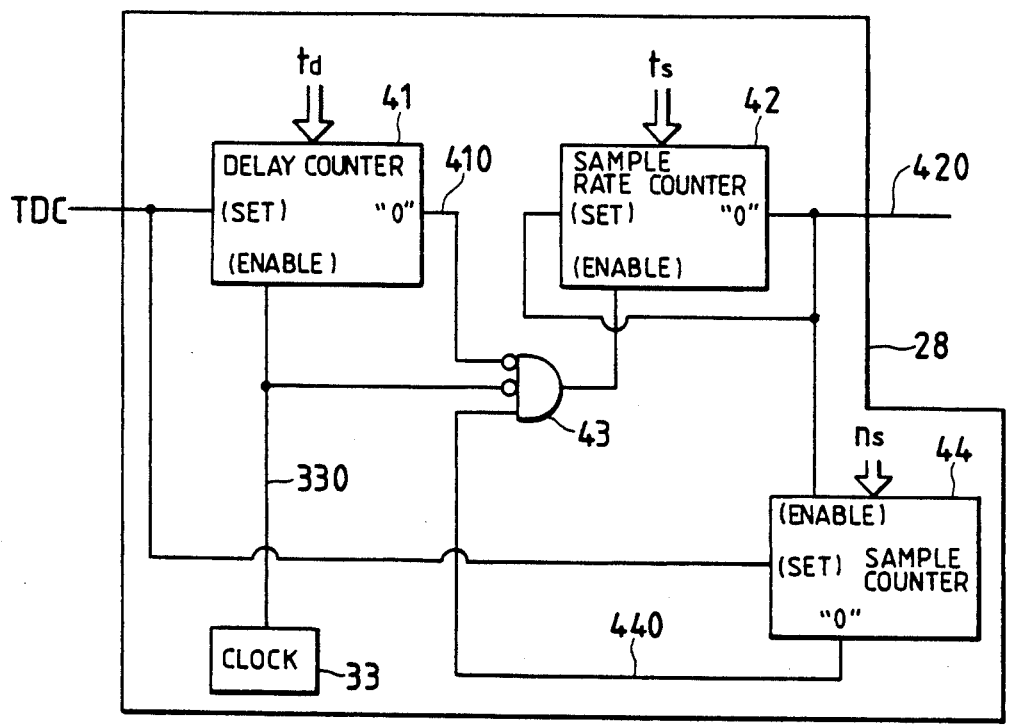
FIG. 6A is a block diagram of a timing circuit 28 in FIG. 1.
Figure 6B:
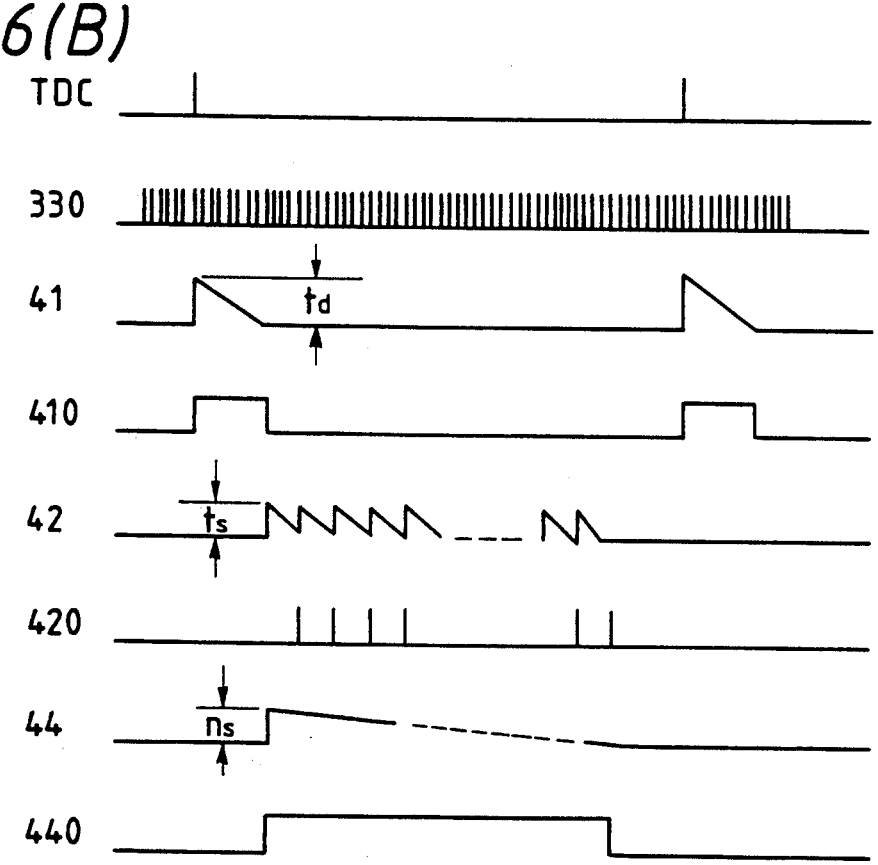
FIG. 6B is a wave form diagram relating to FIG. 6A.

FIG. 6A shows the timing circuit 28 and its operation diagram. The timing circuit 28 consists of a delay counter 41, a sample rate counter 42, a sample counter 44 and an AND gate 43 equipped with an inverter at certain input terminals. The TDC signal is inputted to the set terminal of the delay counter 41 and to the set terminal of the sample counter 44. The output of the clock 33 is inputted to the enable terminal of the delay counter 41 and to the inverter carrying terminal of the AND gate 43. The output of the AND gate 43 is inputted to the enable terminal of the sample rate counter 42. The zero output of the sample rate counter 42 is inputted to the enable terminal of the sample counter 44. It is also inputted to the set terminal of the sample rate counter 42 itself and is further outputted as the sampling signal on line 420. The zero output of the sampling counter 44 is inputted to a non-verting input of the AND gate 43.

When the delay time $t_d$, the sampling number $n_s$ and the frequency division ratio $t_s$ is outputted from CPU 20 to the I/O port 27, $t_d$, $t_s$ and $n_s$ are set into the delay counter, the sample rate counter and the sample counter, respectively, as the initial values of these counters. When the signal is inputted to the set terminal, the zero terminal of each counter becomes 1 and whenever a signal is inputted to the enable terminal, each counter counts down. When the count reaches zero, the output of the zero terminal becomes zero.

When the TDC signal is inputted to the set terminal of the delay counter 41, the zero output becomes 1 and whenever the signal of the clock 33 is inputted to the enable terminal, each counter counts down sequentially. The TDC signal is the one that is outputted when the angle of the crank shaft reaches an angle corresponding to the top dead center. It is produced by hardware or software inside CPU 20 from the $R_{ef}$ signal and $P_{os}$ signal outputted from the crank angle sensor. When the down-count value of the delay counter 41 reaches zero, the zero output on line 410 becomes zero and 1 is inputted to the AND gate 43. Incidentally, since the sample counter 44 has already received the TDC signal under this state and the zero output has become 1, the output signal of the clock 33 is, as it is, inputted to the enable terminal of the sample rate counter 42.

The sample rate counter 42 counts down whenever the clock signal is generated and outputs the sampling signal whenever the count value reaches zero. This output signal is applied to its own set terminal it and uses again $t_d$ as the count value. The zero output is inputted to the enable terminal of the sampling counter 44. A downcount occur and the counter value of the sample counter 44 becomes zero, the zero output becomes zero and the clock signal cannot pass through the AND gate so that the sampling signal is not outputted any more.

Next, the new and useful operation of processing for judging the occurrence of knocking by CPU 29 in accordance with the present invention will be explained with reference to the flowchart of FIG. 7. The operation of this flowchart is actuated periodically in a continuous firing cycle of the engine, and the flowchart is started after ending the analog to digital conversion which is started in response to the TDC signal and is repeated a predetermined number of times $n_s$.

That is to say, the operation of this flowchart is activated as an interrupt signal is outputted to CPU 29 when a predetermined number of digital values of the output of the vibration sensor 15 are held in memory inside RAM 32, that is, when the output of the zero terminal of the sample counter 44 changes from 1 to zero.

Figure 7:
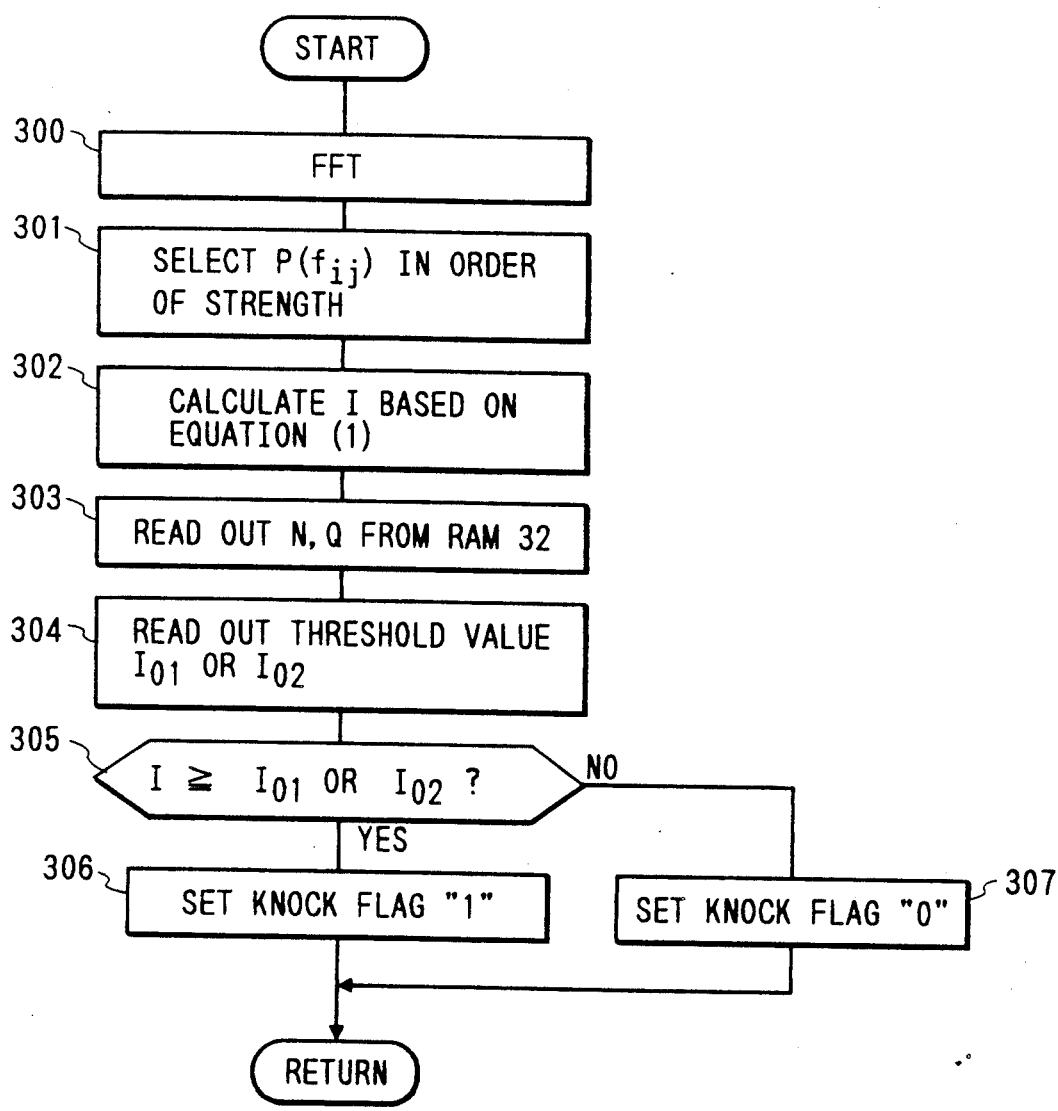
FIG. 7 is a flow-chart which shows an operation of knocking judgement.

At first, in step 300 of FIG. 7, the output data from the vibration sensor 151 is analyzed as to it's frequency using a FFT (Fast Fourier Transformation) method. The analyzed data is memorized as sampling data stored in RAM 32. In order to analyze a resonance frequency component contained in the output from the vibration sensor, a FFT method is used. If needed, a WFT (Walch to Fourier Transformation) method may the used.

In step 301, the main resonance frequency f is selected which is used when the knocking judgement index I is calculated with the formula (1). This selection method is performed by selecting the greatest n (n≦5) of the five power spectra $P(f_{01})$, $P(f_{20})$, $P(f_{01})$, $P(f_{30})$ and $P(f_{11})$ respectively corresponding to the five resonance frequencies $f_{01}$, $f_{20}$, $f_{01}$, $f_{30}$ and $f_{11}$. Then, in step 302, the knocking judgement index I is calculated from the selected power spectra on the basis of the formula (1). When the power spectra $P(f_{10})$ and $P(f_{01})$ are selected, the knocking judgement index I is calculated as shown in FIG. 9A and 9B. At this time, instead of using P, a standardized value may be used; for example, $P(f_{10})/\overline{P}(f_{10})$ instead of $P(f_{10})$ is used. $\overline{P}$ is an average value of the power spectrum P and is calculated from the following formula:

$$\overline{P} = A \cdot \overline{P} + (1-A) \cdot P \ldots \quad (2)$$

Here in formula (1), A is a contributing factor. The value $\overline{P}$ is revised only when there is no occurrence of knocking. The initial value of $\overline{P}$ is read out from ROM 31.

In step 303, the number of revolutions N and the air quantity Q are read out from RAM 32. And, in step 304, the threshold value $I_{01}$ or $I_{02}$ is selected by referring to a table provided in the ROM 31 according to above state valves of N and Q. If the main resonance frequency is greater than the threshold value $I_{01}$ or $I_{02}$, the knocking is judged as occurring at step 305 and the knocking flag is set to "1". If the main resonance frequency is smaller than threshold value $I_{01}$ or $I_{02}$, knocking is judged as not occurring and the knocking flag is set to "0", and is written in DPRAM 25.

The operation represented by the flowchart shown in FIG. 7 is executed before starting of the operation represented by the flowchart shown in FIG. 4A. That is to say, the operation in FIG. 4A is a program for determining the ignition timing before starting of an explosion stroke concerning a certain cylinder of the engine, and the operation in FIG. 4A is usually executed in a compression or suction stroke of the engine. However in the operation in FIG. 7 it is executed just after the explosion stroke.

Since that first feature of the invention can judge the existence of occurrence of knocking from the tone color index, the judgement of the existence of occurrence of knocking can be made even at the time of a high load, high speed operation where the background vibration is great.

Since the second feature of the invention can use an arbitrary frequency component contained in the output of the vibration sensor, the judgement of the existence of occurrence of knocking can be made by use of a suitable resonance frequency component in accordance with the operating condition of the engine. Therefore, whether or not weak knocking occurs can be judged throughout all the operating conditions of the engine.

Since the third feature of the invention can judge the existence of occurrence of knocking by use of the resonance frequency component in which the background vibration becomes small at the time of a high load, high speed operation, whether or not knocking occurs can be judged even at the time of the high load, high speed operation.

Since the fourth feature of the invention can judge the existence of occurrence of knocking at the time of a high load high speed operation, the engine output and fuel efficiency can be improved.

Since the fifth feature of the invention can utilize effectively the information contained in the output of the vibration sensor, an optimum control of the engine output and fuel efficiency can be made.

We claim:

1. An engine controller equipped with a device for judging occurrence of knocking of the engine, comprising:
   a sensor for sampling an internal pressure vibration generated in a cylinder of the engine;
   a knocking detector for judging the occurrence of knocking by extracting at least two frequencies contained in an output from said sensor, deriving a knocking judgement index based on the two extracted frequencies and comparing the knocking judgement index with a threshold value; and
   a controller for controlling ignition timing of the engine based on an output from the knocking detector.

2. An engine controller equipped with a device for judging occurrence of knocking of the engine, as defined in claim 1, wherein said knocking detector includes means for obtaining the knocking judgement index from at least two vibration power factors corresponding to said extracted frequencies.

3. An engine controller equipped with a device for judging occurrence of knocking of the engine, as defined in claim 1, further including means for controlling said sensor to vary the sampling interval for sampling the vibration.

4. An engine controller equipped with a device for judging occurrence of knocking of the engine, as defined in claim 1, wherein said sensor has a constant sensitivity in a frequency range from 5 to 20 KHz.

5. An engine controller equipped with a device for judging occurrence of knocking of the engine, as defined in claim 1, wherein said controller includes means for retarding the ignition timing by a predetermined angle when the knocking detector indicates the occurrence of knocking.

6. An engine controller equipped with a device for judging occurrence of knocking of the engine, as defined in claim 1, wherein said knocking detector includes a first computer responsive to a stored program for judging the occurrence of the knocking, and said controller includes a second computer for calculating the ignition timing o the engine based on an output from the knocking detector and a base ignition timing.

7. An engine controller equipped with a device for judging occurrence of knocking of the engine, as defined in claim 1, wherein said sensor outputs a signal when the vibration is sampled a predetermined number of times, the knocking detector judges the occurrence of knocking based on the signal from said sensor and said controller controls the ignition timing of the engine based on the output from the knocking detector in a predetermined cycle.

8. An engine controller equipped with a device for judging occurrence of knocking of the engine, comprising:
   a sensor for sampling a vibration based on an internal pressure vibration generated in a cylinder of the engine;
   a knocking detector for judging the occurrence of knocking by converting the vibration sampled by the sensor into digital signals, extracting at least two frequencies based on digital frequency analysis of said digital signals, deriving a knocking judgement index based on the extracted frequencies and comparing the knocking judgement index obtained from the two frequencies with a threshold value; and
   a controller for controlling an ignition timing o the engine based on an output from the knocking detector and a base ignition timing.

9. An engine controller equipped with a device for judging occurrence of knocking of the engine, as defined in claim 8, further including means for controlling the sensor to vary a sampling interval for sampling the vibration.

10. An engine controller equipped with a device for judging occurrence of knocking of the engine, as defined in claim 8, wherein the knocking detector includes means for converting the sampled vibration into digital signals by utilizing one of Fast Fourier Transformation method and Walch to Fourier Transformation method.

11. An engine controller equipped with a device for judging occurrence of knocking of the engine, as defined in claim 8, wherein the sensor has a constant sensitivity in a frequency range from 5 to 20 KHz.

12. An engine controller equipped with a device for judging occurrence of knocking of the engine, as defined in claim 1 or 11, wherein the controller means retards the ignition timing a certain angle when the knocking detecting means judges the occurrence of the knocking.

13. An engine controller equipped with a device for judging occurrence of knocking of the engine, as defined in claim 8, wherein the knocking detector includes a first computer responsive to a stored program for judging the occurrence of knocking, and the controller includes a second computer for calculating the ignition timing of the engine based on the output from the knocking detector and the base ignition timing.

14. An engine controller equipped with a device for judging occurrence of knocking of the engine, as defined in claim 8, wherein the sensor outputs a signal when the vibration is sampled a predetermined number of times, the knocking detector judges the occurrence of knocking based on the signal from the sensor and the controller controls the ignition timing of the engine based on the output from the knocking detector in a predetermined cycle.

* * * * *